United States Patent
Anastasio et al.

(10) Patent No.: US 10,786,760 B2
(45) Date of Patent: Sep. 29, 2020

(54) SEPARATOR FOR SEPARATING SOLIDS FROM AN INFLUENT

(71) Applicant: Hydro International Limited, Clevedon (GB)

(72) Inventors: Andrew Scott Anastasio, Portland, ME (US); Andrew Gwinn, Westbrook, ME (US)

(73) Assignee: Hydro International Limited, Clevedon (GB)

( * ) Notice: Subject to any disclaimer, the term of this patent is extended or adjusted under 35 U.S.C. 154(b) by 0 days.

(21) Appl. No.: 16/478,528

(22) PCT Filed: Jan. 17, 2018

(86) PCT No.: PCT/GB2018/050135
§ 371 (c)(1),
(2) Date: Jul. 17, 2019

(87) PCT Pub. No.: WO2018/134590
PCT Pub. Date: Jul. 26, 2018

(65) Prior Publication Data
US 2020/0038781 A1    Feb. 6, 2020

Related U.S. Application Data

(60) Provisional application No. 62/447,688, filed on Jan. 18, 2017.

(51) Int. Cl.
*B01D 21/24* (2006.01)
*B01D 21/00* (2006.01)
*B01D 21/30* (2006.01)

(52) U.S. Cl.
CPC ..... *B01D 21/0003* (2013.01); *B01D 21/0042* (2013.01); *B01D 21/0045* (2013.01);
(Continued)

(58) Field of Classification Search
CPC ............ B01D 21/0042; B01D 21/0045; B01D 21/0087; B01D 21/2433; B01D 21/2444; B01D 21/30
(Continued)

(56) References Cited

U.S. PATENT DOCUMENTS 3,219,189 A * 11/1965 Moore ..................... B03D 1/08
                                                                210/540
3,305,092 A *  2/1967 Turk ...................... B01D 24/22
                                                                210/523
(Continued)

FOREIGN PATENT DOCUMENTS

WO    WO-2013040002 A1    3/2013

OTHER PUBLICATIONS

International Search Report for Application PCT/GB2018/050135 dated Mar. 9, 2018.

*Primary Examiner* — Christopher Upton
(74) *Attorney, Agent, or Firm* — Honigman LLP

(57) ABSTRACT

A wastewater treatment device including a vessel having an inlet for receiving an influent stream, a grit outlet and a floating-matter outlet; a separator disposed within the vessel, wherein the separator comprises a tray assembly connected to the inlet and the grit outlet, the tray assembly including a plurality of nested tray units which define a separator axis and are spaced apart from one another along the separator axis, each tray unit having a substantially conical tray aligned along the separator axis and an aperture in the tray disposed at the separator axis and in communication with the grit outlet, wherein the wastewater treatment device further includes a spray nozzle configured to deliver a jet of fluid towards a surface of water within the vessel, wherein the spray nozzle is angled towards the direction of the floating-matter outlet to force floating matter accumulated on the surface of the water towards and out of the outlet.

10 Claims, 5 Drawing Sheets

US 10,786,760 B2
Page 2

(52) U.S. Cl.
CPC ......... *B01D 21/2444* (2013.01); *B01D 21/30* (2013.01); *B01D 21/0084* (2013.01); *B01D 21/2411* (2013.01); *B01D 21/2427* (2013.01); *B01D 21/2433* (2013.01)

(58) Field of Classification Search
USPC ................................ 210/109, 521, 523, 540
See application file for complete search history.

(56) References Cited

U.S. PATENT DOCUMENTS

| | | | | |
|---|---|---|---|---|
| 5,089,118 | A * | 2/1992 | Mahoney | B01D 21/2433 |
| | | | | 210/523 |
| 5,122,280 | A * | 6/1992 | Russell | B01D 17/0214 |
| | | | | 210/540 |
| 6,613,237 | B2 * | 9/2003 | Pan | B01D 21/2433 |
| | | | | 210/523 |
| 6,645,382 | B1 | 11/2003 | Wilson | |
| 8,182,700 | B2 * | 5/2012 | Tuomikoski | B01D 21/2433 |
| | | | | 210/523 |
| 9,713,779 | B2 * | 7/2017 | Emkey | B01D 17/0214 |
| 2011/0068060 | A1 * | 3/2011 | Hatten | C02F 1/008 |
| | | | | 210/109 |
| 2011/0226693 | A1 | 9/2011 | Andoh et al. | |
| 2012/0152850 | A1 | 6/2012 | Tsai | |

* cited by examiner

SEPARATOR FOR SEPARATING SOLIDS FROM AN INFLUENT

TECHNICAL FIELD

This invention relates to a separator for separating solids from an influent, and is particularly, although not exclusively, concerned with a separator for removing grit from wastewater flow.

BACKGROUND

Wastewater such as that arriving at a sewage treatment facility can contain, among other things, fat, oil, grease and grit (FOGG) which may damage processing equipment and lead to a loss of performance.

A separator for the removal of grit from wastewater flow is described in U.S. Pat. No. 6,645,382. The separator comprises a tray assembly made up of a plurality of stacked settling plates, in the form of trays having a frusto-conical shape. Each tray has a centrally located opening and a lip which extends about the periphery of the tray and projects inwardly. The trays are spaced apart axially so that wastewater may flow between the trays. The stacked trays are submerged in a vessel, such as a grit basin. An influent duct channels wastewater in between the trays and ensures that the wastewater is distributed evenly across the tray stack. The influent duct is arranged to provide a tangential inlet such that a low energy vortex flow is established between adjacent trays. The low energy vortex allows grit particles entrained by the flow to settle on the sloping inner surface of each tray whereupon the particles gravitate towards and pass through the openings in the trays. The grit falls through the openings in underlying trays and out through the bottom of the tray assembly. The grit collects at the bottom of the separator from where it is removed as a concentrate. De-gritted wastewater flows out over the lips of the trays into the grit basin for further processing.

However, it is necessary to provide a further stage upstream or downstream of the separator in order to remove fat, oil and grease, if required.

SUMMARY

In accordance with a first aspect, there is provided a wastewater treatment device includes:

a vessel comprising an inlet for receiving an influent stream, a grit outlet and a floating-matter outlet;

a separator disposed within the vessel, wherein the separator comprises a tray assembly connected to the inlet and the grit outlet, the tray assembly comprising a plurality of nested tray units which define a separator axis and are spaced apart from one another along the separator axis, each tray unit comprising:

a substantially conical tray which is aligned along the separator axis; and an aperture in the tray disposed at the separator axis and in communication with the grit outlet;

wherein the wastewater treatment device further comprises a spray nozzle configured to deliver a jet of fluid towards a surface of water within the vessel, wherein the spray nozzle is angled towards the direction of the floating-matter outlet to force floating matter accumulated on the surface of the water towards and out of the outlet.

By "substantially conical" is meant that the tray is a body of revolution which converges in the direction of the axis of revolution from a wider end to a narrower end. The tray need not have a strictly conical shape but may, for example, be curved or stepped between its wider and narrower ends.

A plurality of spray nozzles may be provided.

The plurality of spray nozzles may be arranged in a row.

The row may extend in a widthwise direction.

The device may comprise a plurality of rows of spray nozzles.

The or each spray nozzle may be a flat-fan spray nozzle.

The spray nozzle may have a coverage which covers an entire width of the vessel or the plurality of spray nozzles may have a combined coverage which covers the entire width of the vessel.

The wastewater treatment device may further comprise a control system which controls the activation of the or each spray nozzle.

The control system may be configured to activate the or each spray nozzle only intermittently.

The or each spray nozzle may be activated at a preset frequency.

The control system may comprise a sensor and wherein the or each spray nozzle may be activated based on the output of the sensor.

The or each spray nozzle may be activated at a frequency which is varied based on the output of the sensor.

The sensor may be a flow meter for determining a flow rate of the influent stream or an effluent.

A skimmer pipe may be provided at the outlet.

For a better understanding of the present invention, and to show more clearly how it may be carried into effect, reference will now be made, by way of example, to the accompanying drawings, in which:

DETAILED DESCRIPTION

Figure 1:
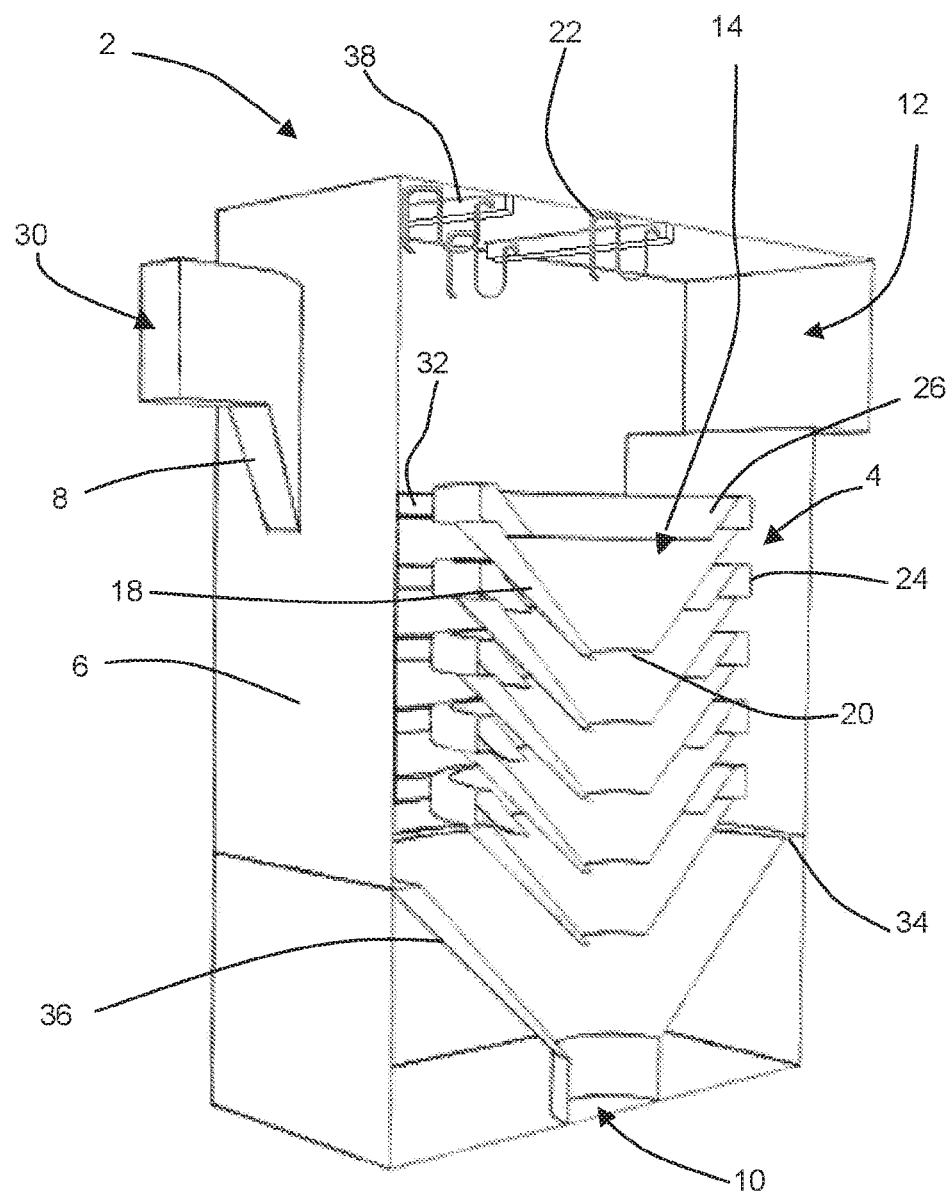
FIG. 1 is a perspective sectional view of a separator according to an embodiment of the invention.

FIG. 1 shows a separator 2 comprising a tray assembly 4 disposed within a treatment vessel 6. The tray assembly 4 comprises a plurality of nested tray units 14. Five tray units 14 are shown in FIG. 1, but it will be appreciated that the tray assembly could comprise more or fewer tray units 14. The nested tray units 14 define a separator axis 16, shown in FIGS. 2 and 3, which is upright and preferably substantially vertical. The tray units 14 are spaced apart from each other along the axis 16. The treatment vessel 6 is provided with an inlet chute 8, a grit outlet 10 and a fluids outlet 12.

Each tray unit 14 comprises a frusto-conical tray 18, having a circular aperture 20 at the apex of the tray 18. The axis of the conical shape of the tray 18 is aligned with the separator axis 16. The tray 18 converges in a downward direction. A cylindrical rim 24 extends upwardly from the outer periphery of the tray 18 and an annular lip 26 extends radially inwardly from the extremity of the rim 24. The radially inward portion of the annular lip 26 is inclined so as to be parallel to the direction of the upper surface of the tray 18. The rim 24 and annular lip 26 may be formed integrally with the tray 18 by a folded over portion of the tray 18. The rim 24 and annular lip 26 can be separately manufactured and assembled with the tray 18, or can be formed integrally with the tray 18, for example, when the tray is a plastics molding.

Figure 2:
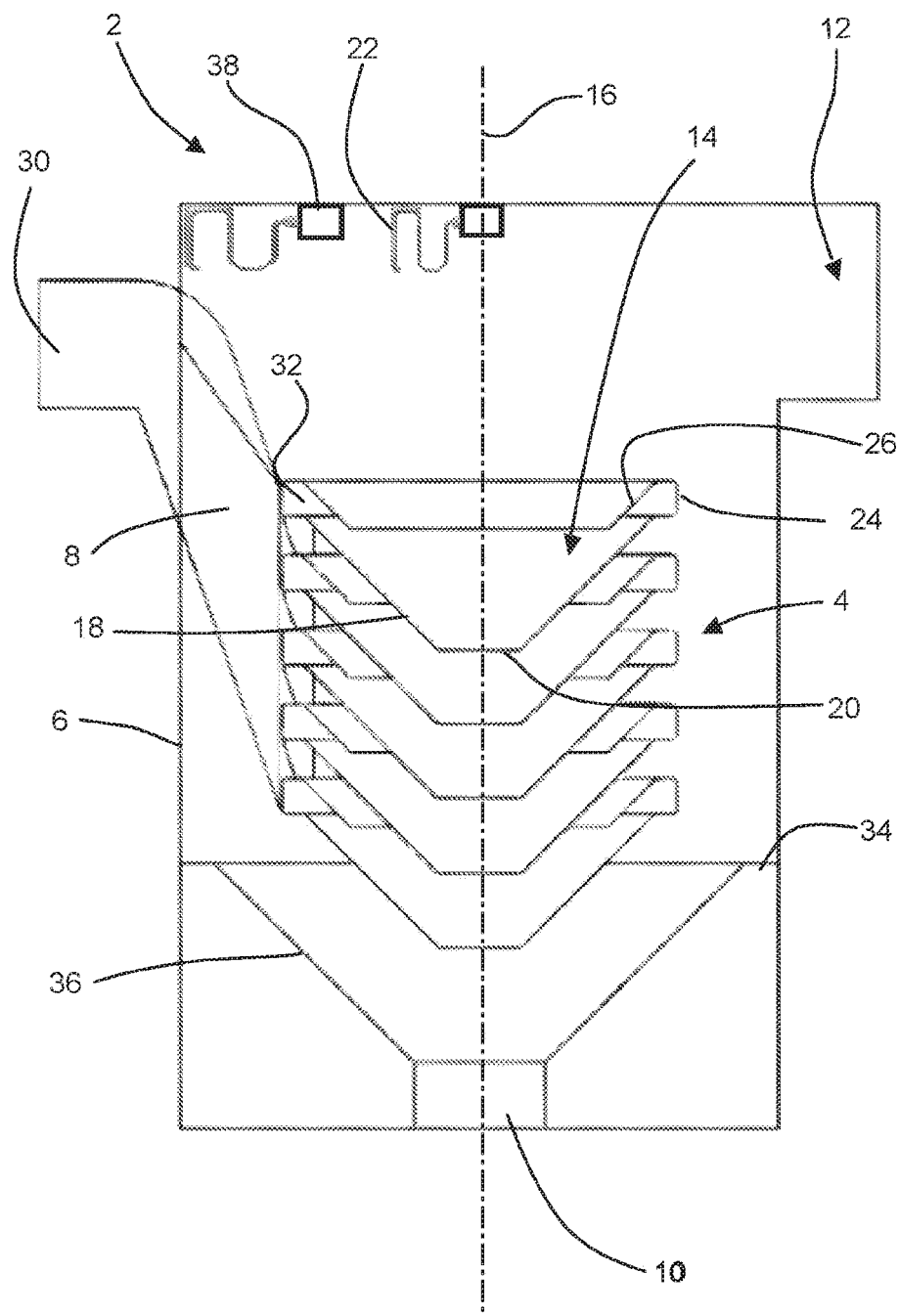
FIG. 2 is a sectional view of the separator shown in FIG. 1.
Figure 3:
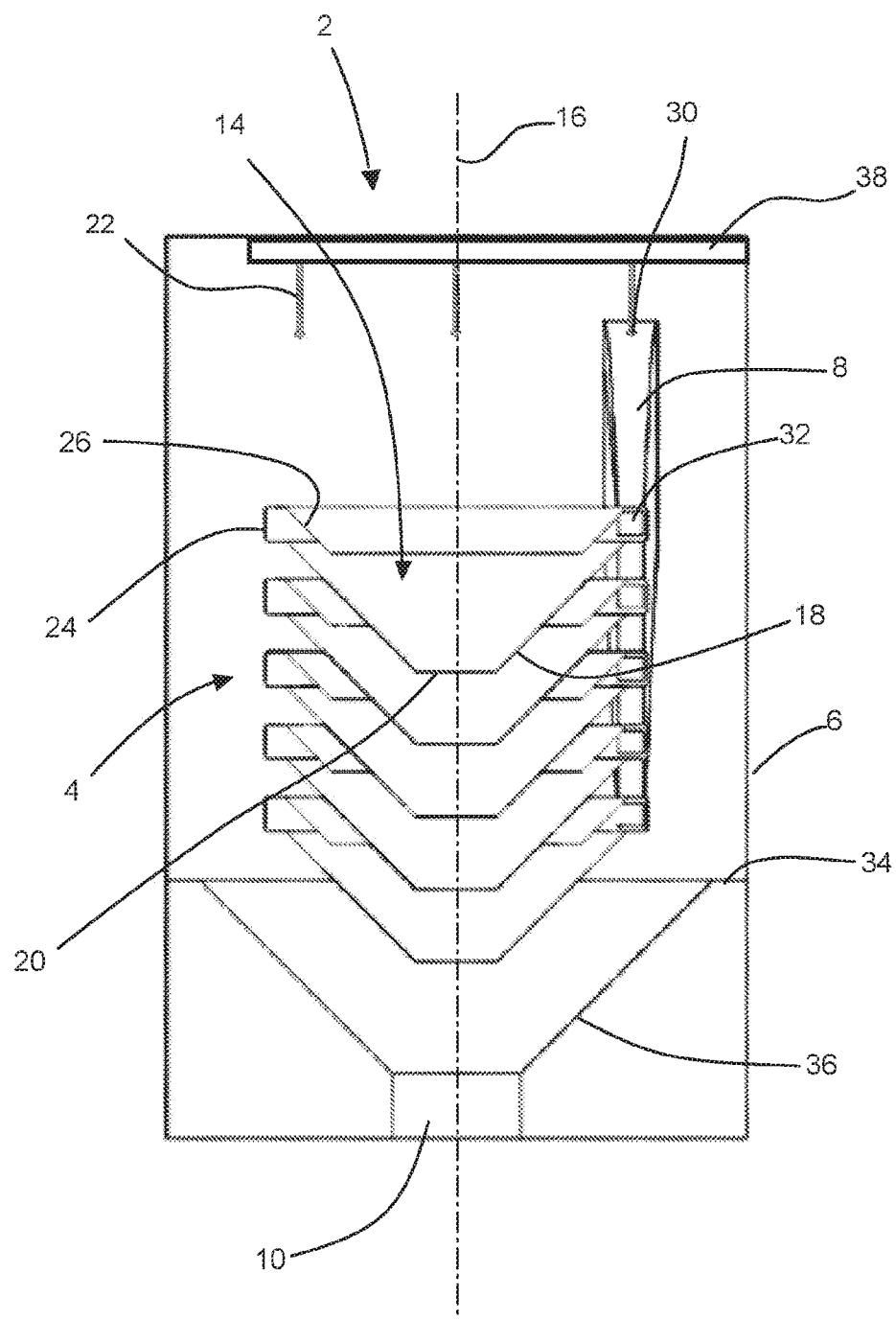
FIG. 3 is a sectional view of the separator shown in FIG. 1 taken in a direction perpendicular to that of FIG. 2.

Referring to FIGS. 2 and 3, the inlet chute 8 has a single inlet 30 and a plurality of outlets 32. The chute 8 extends into the treatment vessel 6 through an outer wall of the treatment vessel 6 and is in direct communication with the tray assembly 4. The mid-portion of the chute 8 is inclined in a downward direction from the inlet 30 to the outlets 32. The mid-portion of the chute 8 diverges in a vertical direction from the inlet 30 towards the outlets 32. The outlets 32 are aligned vertically and extend from the lower end of the mid-portion of the chute in a horizontal direction. Each of the outlets 32 is in direct communication with a respective tray unit 14 and arranged tangentially with respect to the separator axis 16 (shown in FIGS. 3 and 4). In particular, the outlets 32 are in direct communication with the region between the annular lip 26 and the upper surface of the tray 18.

A plate 34, provided with a funnel section 36, is disposed within the base of the treatment vessel 6. The plate 34 extends horizontally across the extent of the vessel 6 and the funnel section 36 converges in a downward direction. The outlet 10 is provided in the lower region of the funnel section 36 and opens into a sump (not shown) below the vessel 6. The funnel section 36 is arranged coaxially with the separator axis 16.

Figure 4:
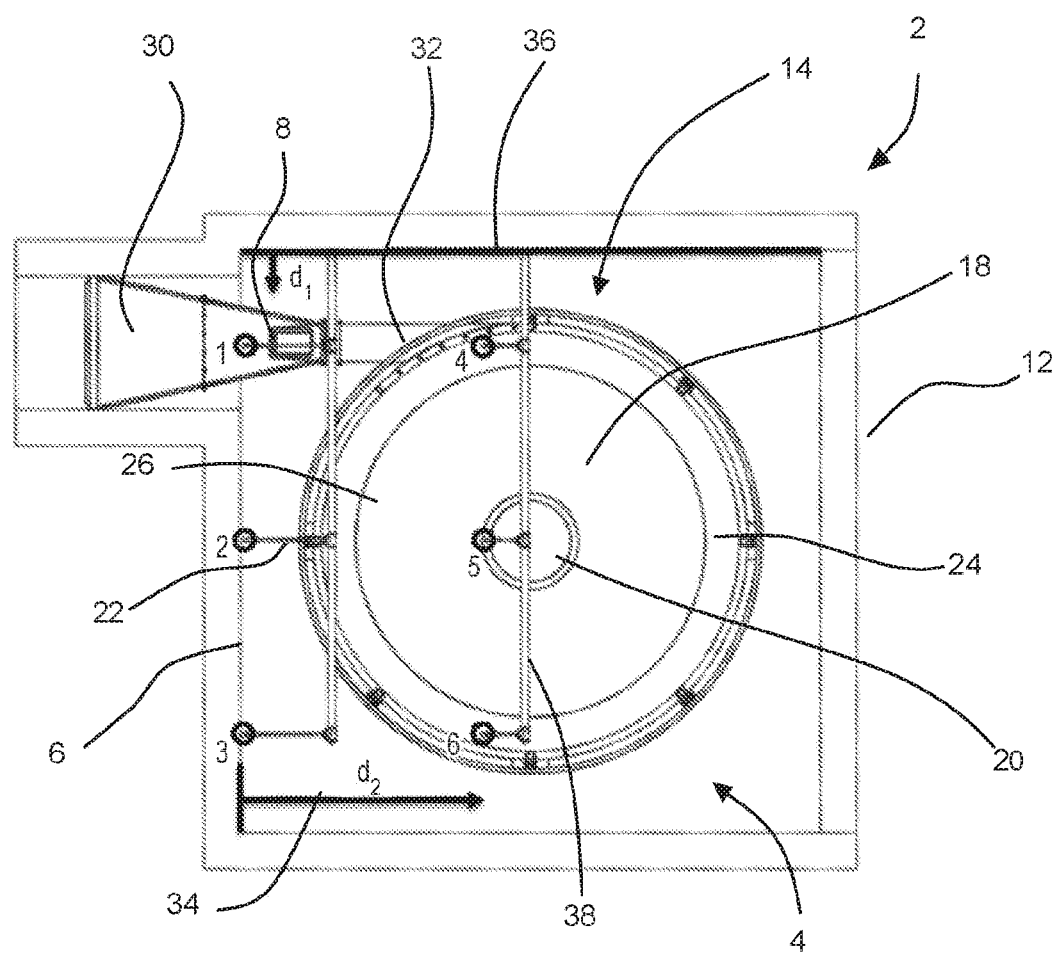
FIG. 4 is a sectional plan view of the separator shown in FIG. 1.

A plurality of spray nozzles 22 are provided within the separator 2. As best shown in FIG. 4, the spray nozzles 22 are provided along bars 38 which extend along at least part of the width of the separator. In the embodiment shown, the separator 2 comprises a first bar 38 located towards the inlet 30 in a lengthwise direction ($d_2$) and a second bar located at the center of the separator such that it is perpendicular to the separator axis 16. Each bar 38 carries three spray nozzles 22 which are spaced from one another along the bar 38. The spray nozzles 22 are arranged so that one is located at the center of the separator in a widthwise direction ($d_1$) and the two other spray nozzles 22 are located towards opposite sides of the separator 2.

The spray nozzles 22 are connected to a feed pipe provided at the respective bar 38 by a flexible hose. The bars 38 receive a fluid supply and comprise a manifold which distributes the fluid to the spray nozzles. Alternatively, each spray nozzle 22 may have its own dedicated fluid supply.

The separator 2 may be part of a waste water treatment installation, and its function may be to separate fat, oil, grease and grit from a flow of waste water prior to further treatment processes.

During use, the treatment vessel 6 is flooded so that the tray assembly 4 is submerged. An influent mixture containing grit and grease entrained by water is supplied though the chute inlet 30 and flows downwardly along the chute 8 and through the outlets 32 into respective tray units 14. The tangential arrangement of the outlets 32 causes the mixture to circulate within the tray units 14 about the separator axis 16.

The circulating flow is a relatively low energy flow which allows the entrained grit to settle on the upper surfaces of the trays 18. The sloped upper surface of each tray 18 causes the grit to gravitate towards the aperture 20 in the tray 18. The grit falls through the aperture 20. The grit settles on the upper surface of the underlying tray 18 and gravitates towards and through the aperture 20 of the underlying tray 18. The grit passes through the apertures 20 of the underlying trays 18 until it is expelled from the bottom of the tray assembly 4. The grit is then discharged from the treatment vessel 6 through the outlet 10, for example, to the sump (not shown) beneath the vessel 6.

The water from which grit is removed circulates within the tray units 14. As the de-gritted water circulates within each tray unit 14 it flows upwardly over the annular lip 26 and over the rim 24 into the outer region of the treatment vessel 6. The annular lips 26 thus help to retain grit which has collected on the surface of each tray 18 within the tray units 14. De-gritted water which collects in the vessel 6 overflows through the outlet 12 which forms an overflow weir.

The arrangement of the separator 2 creates low velocity area in the corners and center of the treatment vessel 6. These quiescent areas encourage the coagulation of free floating grease and oil at the surface of the water.

Figure 5:
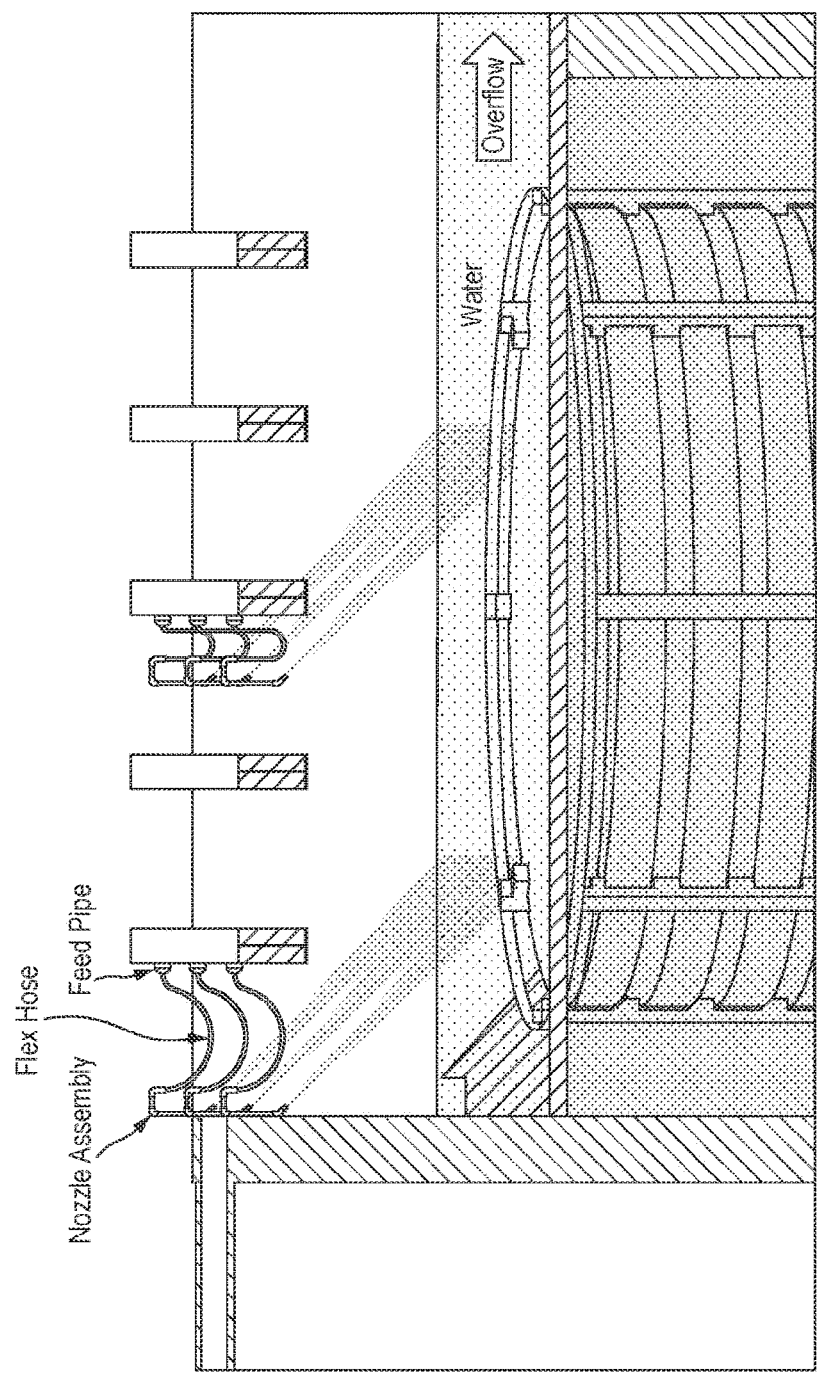
FIG. 5 is a perspective view showing the separator of FIG. 1 in use.

As shown in FIG. 5, the spray nozzles 22 can be used to skim the grease from the surface of the water. The spray nozzles 22 are flat-fan spray nozzles which deliver a fluid, such as water or air, to the surface of the water within the treatment vessel 6. Each spray nozzle provides a jet which fans out along the width of the treatment vessel 6. The spray nozzles 22 are arranged such that, based on the spray angle of the nozzle used, they cover the entire width of the treatment vessel 6. In some arrangements, it may be desirable for the jets from the nozzles 22 to overlap.

The spray nozzles 22 are installed above the highest expected water level in the treatment vessel 6. The flat spray nozzles provide full coverage of the width of the treatment vessel 6 while also minimizing water requirements compared to round orifices.

The spray nozzles 22 are arranged such that the jets are angled down and towards the overflow weir formed by the outlet 12 to create a cleansing velocity on the water surface. Consequently, the fluid skims grease from the surface of the water, forcing it towards the outlet 12 and out of the treatment vessel 6.

It has been found that nuisance floating material tends to collect in the center of the unit and along the walls and only becomes a significant issue when the two masses connect to form one solid mat. The spray nozzles 22 therefore may be operated only intermittently based on an automated cycle which is set so that the spray nozzles 22 are activated with sufficient frequency in order to remove the floating material before the masses connect. Specifically, the application of the spray nozzles 22 is controlled by a control system which automatically activates the spray nozzles 22. The activation of the spray nozzles 22 may be controlled based on a set time interval or may have a frequency which is varied based on the flow rate into the separator 2, for example. The flow rate may be measured using a sensor, such as a flow meter. Alternatively, the frequency may be varied based on the output of other sensors. For example, a sensor, such as a weight sensor, may be used to measure the amount of grit collected by the separator 2 at the outlet 10. This measurement may provide a correlation which the accumulation of grease and other floating matter on the surface of the water and so provide an indication of the required frequency of operation. The control system may instead use an image sensor which can actively monitor whether the floating material in the center of the unit and along the walls are becoming too large and too close together. The control system may therefore only activate the spray nozzles when actually necessary.

As the spray nozzles 22 are only activated intermittently, the amount of water required (where used) is minimized.

Similarly, where air is supplied by the spray nozzles 22, their intermittent use reduces the energy required to power the system (e.g. in operating a compressor).

Although not shown, the treatment vessel 6 may be provided with baffles or other guide members located in the corners which direct grease towards the outlet 12. The spray nozzles 22 may direct the grease into a rotating skimmer pipe that would direct the collected grease to a decanter or other ancillary process.

Although the spray nozzles 22 have been described as forcing accumulated grease towards the outlet 12, it will be appreciated that, where desired, the grease may be removed via a separate outlet which may be perpendicular to the outlet 12. In this instance, the spray nozzles 22 may direct the grease towards the separate outlet.

It will be appreciated that the number and arrangement of spray nozzles may differ from that shown and described above. In particular, the number of spray nozzles in each row and the number of rows may be chosen based on the size of the treatment vessel. For smaller treatment vessels, a single spray nozzle may have sufficient coverage to cover the full width of the vessel and provide sufficient flow to force the grease out of the outlet.

The invention claimed is:

1. A wastewater treatment device comprising:
   a vessel comprising an inlet for receiving an influent stream and a grit outlet;
   a separator disposed within the vessel, wherein the separator comprises a tray assembly connected to the inlet and the grit outlet, the tray assembly comprising a plurality of nested tray units which define a separator axis and are spaced apart from one another along the separator axis, each tray unit comprising:
   a substantially conical tray which is aligned along the separator axis; and
   an aperture in the tray disposed at the separator axis and in communication with the grit outlet;
   wherein the wastewater treatment device further includes a floating-matter outlet for removing the de-gritted water from the vessel;
   wherein the wastewater treatment device further includes at least one spray nozzle configured to deliver a jet of fluid towards a surface of water within the vessel, wherein the spray nozzle is angled towards the direction of the floating-matter outlet to force floating matter accumulated on the surface of the water towards and out of the floating-matter outlet;
   wherein the wastewater treatment device further includes a control system which controls the activation of the spray nozzle;
   wherein the control system is configured to activate the spray nozzle only intermittently;
   wherein the control system includes a flow meter for determining a flow rate of the influent stream or an effluent; and
   wherein the spray nozzle is activated at a frequency which is varied based on the output of the flow meter.

2. A wastewater treatment device as claimed in claim 1, wherein the floating-matter outlet is configured such that the de-gritted water is removed from the vessel by overflowing through the floating-matter outlet.

3. A wastewater treatment device as claimed in claim 1, wherein said at least one spray nozzle includes a plurality of spray nozzles.

4. A wastewater treatment device as claimed in claim 3, wherein the plurality of spray nozzles are arranged in a row.

5. A wastewater treatment device as claims in claim 4, wherein the row extends in a widthwise direction.

6. A wastewater treatment device as claimed in claim 1, wherein the at least one spray nozzle includes a plurality of rows of spray nozzles.

7. A wastewater treatment device as claimed in claim 1, wherein the spray nozzle is a flat-fan spray nozzle.

8. A wastewater treatment device as claimed in claim 1, wherein the spray nozzle has a coverage which covers an entire width of the vessel or the plurality of spray nozzles have a combined coverage which covers the entire width of the vessel.

9. A wastewater treatment device as claimed in claim 1, wherein the spray nozzle is activated at a preset frequency.

10. A wastewater treatment device as claimed in claim 1, wherein a skimmer pipe is provided at the floating-matter outlet.

* * * * *